US012654228B2

(12) United States Patent
Walker et al.

(10) Patent No.: US 12,654,228 B2
(45) Date of Patent: Jun. 16, 2026

(54) HIGH ENERGY 3-D PRINTER EMPLOYING CONTINUOUS PRINT PATH

(71) Applicant: Wisconsin Alumni Research Foundation, Madison, WI (US)

(72) Inventors: Brandon Joseph Walker, Madison, WI (US); Thomas Rockwell Mackie, Verona, WI (US); Nathan Donald Schumacher, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 723 days.

(21) Appl. No.: 17/357,416

(22) Filed: Jun. 24, 2021

(65) Prior Publication Data

US 2022/0410275 A1     Dec. 29, 2022

(51) Int. Cl.
| | |
|---|---|
| *B22F 12/45* | (2021.01) |
| *B22F 10/28* | (2021.01) |
| *B22F 12/20* | (2021.01) |
| *B22F 12/37* | (2021.01) |
| *B22F 12/50* | (2021.01) |
| *B33Y 30/00* | (2015.01) |
| *B33Y 40/10* | (2020.01) |

(52) U.S. Cl.
CPC .............. *B22F 12/45* (2021.01); *B22F 10/28* (2021.01); *B22F 12/20* (2021.01); *B22F 12/37* (2021.01); *B22F 12/50* (2021.01); *B33Y 30/00* (2014.12); *B33Y 40/10* (2020.01)

(58) Field of Classification Search
None
See application file for complete search history.

(56) References Cited

U.S. PATENT DOCUMENTS

| | | | |
|---|---|---|---|
| 5,637,175 | A | 6/1997 | Feygin et al. |
| 5,658,412 | A | 8/1997 | Retallick et al. |
| 5,837,960 | A | 11/1998 | Lewis et al. |
| 7,291,002 | B2 | 11/2007 | Russell et al. |
| 8,021,138 | B2 | 9/2011 | Green |
| 8,172,562 | B2 | 5/2012 | Mattes |
| 9,321,215 | B2 | 4/2016 | Dudley |
| 9,399,321 | B2 | 7/2016 | Ljungblad |
| 9,415,443 | B2 | 8/2016 | Ljungblad et al. |
| 2008/0042321 | A1 | 2/2008 | Russell et al. |
| 2009/0283501 | A1 | 11/2009 | Erikson et al. |
| 2012/0211926 | A1 | 8/2012 | Larsson et al. |

(Continued)

FOREIGN PATENT DOCUMENTS

| | | | |
|---|---|---|---|
| DE | 102016013317 | A1 | 5/2018 |
| DE | 102016013319 | A1 | 5/2018 |

(Continued)

OTHER PUBLICATIONS

International Search Report for PCT/US2022/032785 dated Sep. 28, 2022.

*Primary Examiner* — Farah Taufiq
(74) *Attorney, Agent, or Firm* — Boyle Fredrickson, S.C.

(57) ABSTRACT

High-throughput printing, possible with multiple electron beams, is facilitated by a continuous powder bed preparation process operating in parallel to apply and pre-sinter the powder along a continuous helical path. The sintered powder may be self-supporting to allow unconstrained expansion in the radial direction when high energy is used for powder fusion.

9 Claims, 5 Drawing Sheets

(56)  References Cited

U.S. PATENT DOCUMENTS

| | | |
|---|---|---|
| 2014/0191439 A1 | 7/2014 | Davis |
| 2015/0306819 A1 | 10/2015 | Ljungblad |
| 2016/0167303 A1* | 6/2016 | Petelet .................. B29C 64/268 |
| | | 219/76.12 |
| 2016/0263832 A1 | 9/2016 | Bui et al. |
| 2016/0279706 A1 | 9/2016 | Domrose et al. |
| 2016/0368050 A1 | 12/2016 | Morris et al. |
| 2017/0021455 A1 | 1/2017 | Dallarosa et al. |
| 2017/0173886 A1 | 6/2017 | Menchik et al. |
| 2017/0213689 A1 | 7/2017 | Abe et al. |
| 2017/0304894 A1 | 10/2017 | Buller |
| 2018/0085995 A1 | 3/2018 | Davis |
| 2018/0200962 A1 | 7/2018 | Redding et al. |
| 2018/0345373 A1 | 12/2018 | Holford et al. |
| 2019/0022752 A1 | 1/2019 | Twelves, Jr. et al. |
| 2019/0113907 A1 | 4/2019 | Roychowdhury et al. |
| 2019/0160539 A1 | 5/2019 | Lei et al. |
| 2019/0299283 A1 | 10/2019 | Sheinman |
| 2020/0139631 A1* | 5/2020 | Buller .................. B29C 64/393 |
| 2020/0156321 A1* | 5/2020 | Lin ........................ G06F 30/00 |
| 2021/0046703 A1* | 2/2021 | Hoppe .................. B29C 64/153 |
| 2021/0107214 A1* | 4/2021 | Khairallah ............ B29C 64/205 |
| 2021/0107222 A1* | 4/2021 | Shmuel ................. B29C 64/255 |
| 2021/0229361 A1* | 7/2021 | TenHouten ........... B29C 64/264 |
| 2022/0072786 A1* | 3/2022 | Weiss .................... B29C 64/295 |

FOREIGN PATENT DOCUMENTS

| | | | |
|---|---|---|---|
| EP | 2983896 B1 | 2/2014 | |
| WO | WO-2019035810 A1 * | 2/2019 | ......... B23K 26/0006 |
| WO | 2019094294 A1 | 5/2019 | |

* cited by examiner

RECEIVE PART MODELS AND VALUES ⟶ 101

OPTIMIZE VALUE BASED OBJECTIVE FUNCTION ⟶ 102

PRINT MULTIPLE PART COMPOSITE ⟶ 104

HIGH ENERGY 3-D PRINTER EMPLOYING CONTINUOUS PRINT PATH

STATEMENT REGARDING FEDERALLY SPONSORED RESEARCH OR DEVELOPMENT

CROSS REFERENCE TO RELATED APPLICATION

Background of the Invention

The present invention relates to three-dimensional printers and in particular to printers using powder materials applied in layers and melted in place.

Three-dimension printers for implementing additive machining may create printed objects by incrementally depositing material first to a print bed then to previously deposited layers in a layer-by-layer fashion. A variety of different 3-D printing technologies exist. Photo polymerization techniques use lasers to polymerize a thin surface of liquid over a print bed, the latter of which is gradually withdrawn beneath the liquid surface as the object is built up. Extrusion techniques use a similar approach but extrude material such as molten plastic from a nozzle in successive layers. Powder bed systems employ a laser or electron beam to sinter or melt particles of a powder bed into a solid structure. After each layer is formed, additional powder is added on top of that layer and the process repeated.

Metal objects are most frequently constructed by 3-D printers using powder bed techniques with metallic powders fused by a laser beam or electron-beam. In these techniques, the ability to construct high-resolution, large models using 3-D printing is limited by the limited energy transfer rate of the scanning beam. A slow printing speed has a disproportionate effect on larger, high-resolution models where printing volumes scale exponentially.

U.S. Pat. No. 9,981,312 issued May 29, 2018, and assigned to the same assignee as the present invention and hereby incorporated by reference, describes a powder printing process using a cathode comb of multiple electron beams that may simultaneously print in unison, potentially substantially increasing the speed of large-area electron-beam printing.

SUMMARY OF THE INVENTION

The present inventors have recognized that speed gains for large area electron beam printing are limited not only by the rate of energy deposition but also by the foundational steps of preparing the print surface, including applying the print powder and sintering the powder to prevent electrostatic scatter. Accordingly, in one embodiment, the present invention combines a high-flux electron beam with powder bed preparation elements operating in parallel at different locations along a continuous track eliminating the need to stop or interrupt the fusing process. The invention may further better accommodate high rates of energy deposition by applying the electron beam to freestanding sintered powder that is unconstrained by radial walls to better handle expansion caused by large heat input without wasteful excess powder margins.

More specifically, in one embodiment, the invention provides a three-dimensional printer having a print bed for supporting an object to be printed and a powder dispenser movable with respect to the print bed throughout a path projecting to a closed loop on the print bed for applying a layer of powder over the print bed along a path. A sintering energy source is movable with respect to the print bed throughout the path and positioned along the path after the powder dispenser to sinter the powder throughout a height of the layer, and a multi-cathode electron source is movable with respect to the print bed throughout the path and positioned along the path after the sintering energy source and steerable to selectively liquefy only portions of the sintered powder to produce a printed part.

It is thus a feature of at least one embodiment of the invention to allow each of these necessary processes to be performed without physical interference on different portions of a continuous path. It is yet another feature of at least one embodiment of the invention to accommodate extremely high electron fluxes by providing an integrated powder substrate with full depth sintering.

The powder dispenser, sintering energy source, and multi-cathode electron source may operate simultaneously to apply a layer of powder, sinter the powder, and liquefy the sintered powder.

It is thus a feature of at least one embodiment of the invention provides a system that allows independent tuning of the throughput of each print bed processing step thereby eliminating the need for one process to wait for another process's completion.

The multi-cathode electron source may be positioned to follow the sintering energy source at a proximity and speed to prevent the average temperature of the sintered layer from decreasing more than 25% between the sintering and the fusing.

It is thus a feature of at least one embodiment of the invention to allow the sintering process to also preheat the material for fusing, further boosting the print speed.

The sintered layer may be substantially unconstrained at its limits on either side of the path axis during the fusing process.

It is thus a feature of at least one embodiment of the invention to accommodate high energy flux printing that can produce substantial thermal expansion and distortion if otherwise constrained by walls such as are required to avoid wasteful, loose powder boundaries.

The print bed may rotate about an axis and translates along the axis with respect to the sintering energy source and multi-cathode electron source and powder dispenser so that the sintering energy source and multi-cathode electron source and powder dispenser pass helically to trace a circular region of the print bed as powder layers are added along a helical path.

It is thus a feature of at least one embodiment of the invention to provide a mechanically simple continuous path accommodating an arbitrary number of layers for large print objects.

The three-dimensional printer may further include a traveling form extending along only a portion of the path and providing radially opposed walls receiving powder from the powder dispenser and retaining the powder therein during sintering, the traveling form moving with respect to the sintered powder layer as the print bed rotates about the axis and translates along the axis with respect to the sintering energy source and multi-cathode electron source.

It is thus a feature of at least one embodiment of the invention to constrain the print ribbon closely to the printed part to conserve powder while also accommodating high thermal expansion associated with high-energy deposition rates.

The radially opposed walls may be supported to vary separation of the walls as the walls move with respect to the sintered powder layer.

It is thus a feature of at least one embodiment of the invention to flexibly provide a continuous sintered layer of varying width tailored to the particular printed part.

The radially opposed walls may include cooling channels for receiving a flowing coolant.

It is thus a feature of at least one embodiment of the invention to allow sintering to occur close to the constraining walls to reduce wasted powder usage.

The sintering energy source may provide a flux per area that varies radially across the print layer to increase sintering near the walls.

It is thus a feature of at least one embodiment of the invention to provide good mechanical integrity to the sintered layer while accommodating part removal by reduced strength sintering near the printed part.

The sintering energy source provides an area of simultaneous heating of greater than one square centimeter.

It is thus a feature of at least one embodiment of the invention to provide a sintering process compatible with high printing speeds practical with higher energy deposition rates.

The sintering energy source may be electrostatically neutral.

It is thus a feature of at least one embodiment of the invention to increase the sintering speed without incurring the very electrostatic scattering that the sintering is intended to prevent.

The invention may include an electronic computer executing a program in stored memory to receive a set of three-dimensional models describing printed parts each assigned to an economic value and generating different combinations of the printed parts with different orientations such as may fit within a predefined printed volume. For each iteration, the computer may evaluate an objective function indicating a total value of the predefined printed volume with a particular combination of printed parts and select an iteration and its combination of printed parts and orientations for printing based on the objective function. The selective iteration is then output for printing on a three-dimensional printer of the type described above.

It is thus a feature one object of the invention to leverage the features of the above described 3-D printer, such that the scaling limitations of 3-D printing are avoided, resulting in a decrease in cost of 3-D printed parts by maximizing utilization of the print volume.

These particular objects and advantages may apply to only some embodiments falling within the claims and thus do not define the scope of the invention.

DETAILED DESCRIPTION OF THE PREFERRED EMBODIMENT

Figure 1:
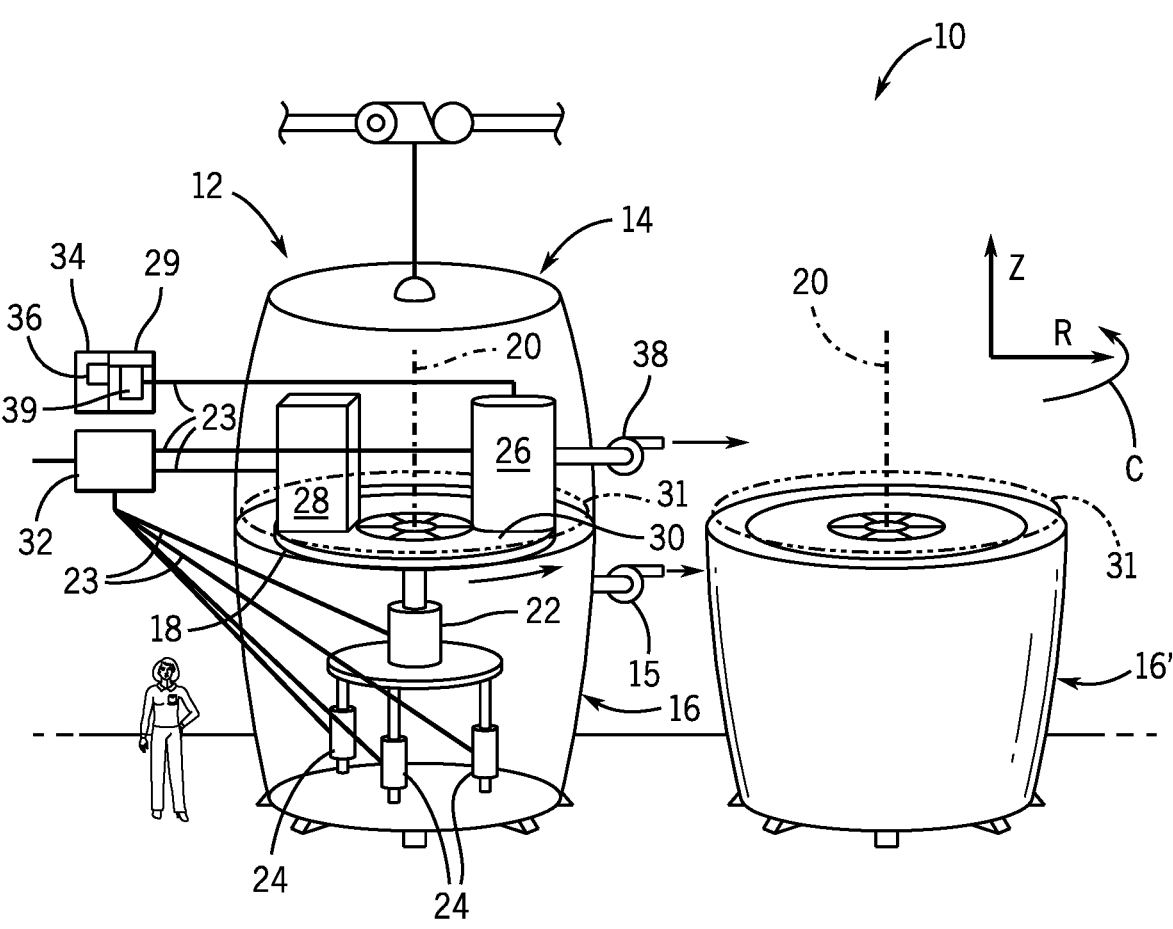
FIG. 1 is a perspective phantom view of an apparatus constructed according to the present invention and providing a continuous helical printing path, the figure showing a removable upper print head that may be moved between different print beds.

Referring now to FIG. 1, a three-dimensional printer 10 suitable for practice of the present invention may include a vacuum housing 12 having an upper printhead portion 14 and lower print bed portion 16 which may be connected together during a printing process and separated for pre- or post-printing activity. In this respect, the lower print bed portion 16 may communicate with a vacuum pump 15 and provides an airtight chamber in which a vacuum may be drawn during printing by a pump 15 or supplemented by pump 38. It will be appreciated that the lower print bed portion 16 or vacuum housing 12 may be substantially smaller than shown in FIG. 1, minimizing the time required to pump down to a vacuum sufficient to prevent metal oxidation and allow for the unimpeded traversal of particle beams.

When the upper printhead portion 14 is separated from the lower print bed portion 16, a vacuum separator 31 may maintain the vacuum within the lower print bed portion 16 through a set of seals and gates allowing the necessary communication between the upper printhead portion 14 and lower print bed portion 16 during printing but sealing the lower print bed portion 16 when the upper printhead portion 14 is removed. After separation, the upper printhead portion 14 may be transferred to a second print bed portion 16' allowing printing to resume and similarly upper printhead portion 14 may be maintained at vacuum during this transfer through a set of seals and gates. During this separation and transfer, the previous lower print bed portion 16 may be maintained at vacuum to allow cooldown of the printed part without oxidation. Separately, the incoming lower print bed portion 16' may have been already pumped down and maintained at vacuum using its vacuum separator 31 and independent vacuum pump 15.

The print bed portion 16 may provide a horizontally extending, disk-shaped print bed 18 supported within the airtight chamber for rotation about a vertical axis 20 (z-axis) and for translation motion vertically along that axis 20 by means of a combination of one or more rotary motors 22 and linear motors 24.

Positioned above the print bed 18 in the upper printhead portion 14 near its outer rim are a fusing station 26 and powder preprocessing station 28 as will be described in more detail below, each aligned with respect to a common radius of the print bed 18 to process steps of the printing of parts. As the print bed 18 rotates and translates, the printing process proceeds along a helical path with respect to the print bed 18 adding printed layers over previously printed layers. Generally, the helical path projects to a closed circular path 30 on the print bed 18 upper surface. The fusing station 26 and powder preprocessing station 28 may remain fixed with respect to the vacuum housing 12 and the print bed 18 moved; however, it will be appreciated that the opposite approach may also be adopted.

The fusing station 26 may communicate with a secondary vacuum pump 38 for providing a harder vacuum at the fusing station 26 than in the remainder of the vacuum housing 12 as will be discussed below.

Control signals along control lines 23 may be provided to each of the rotary motors 22, linear motors 24, fusing station 26, and powder preprocessing station 28 from a power unit 32 communicating with electronic computer 34 to provide controlled power, or from the electronic computer 34 directly. The electronic computer 34 may include one or more processors 36 and a computer memory 29, the latter holding a stored program 39 coordinating operation of the various above-described components as will be discussed.

Figure 2:
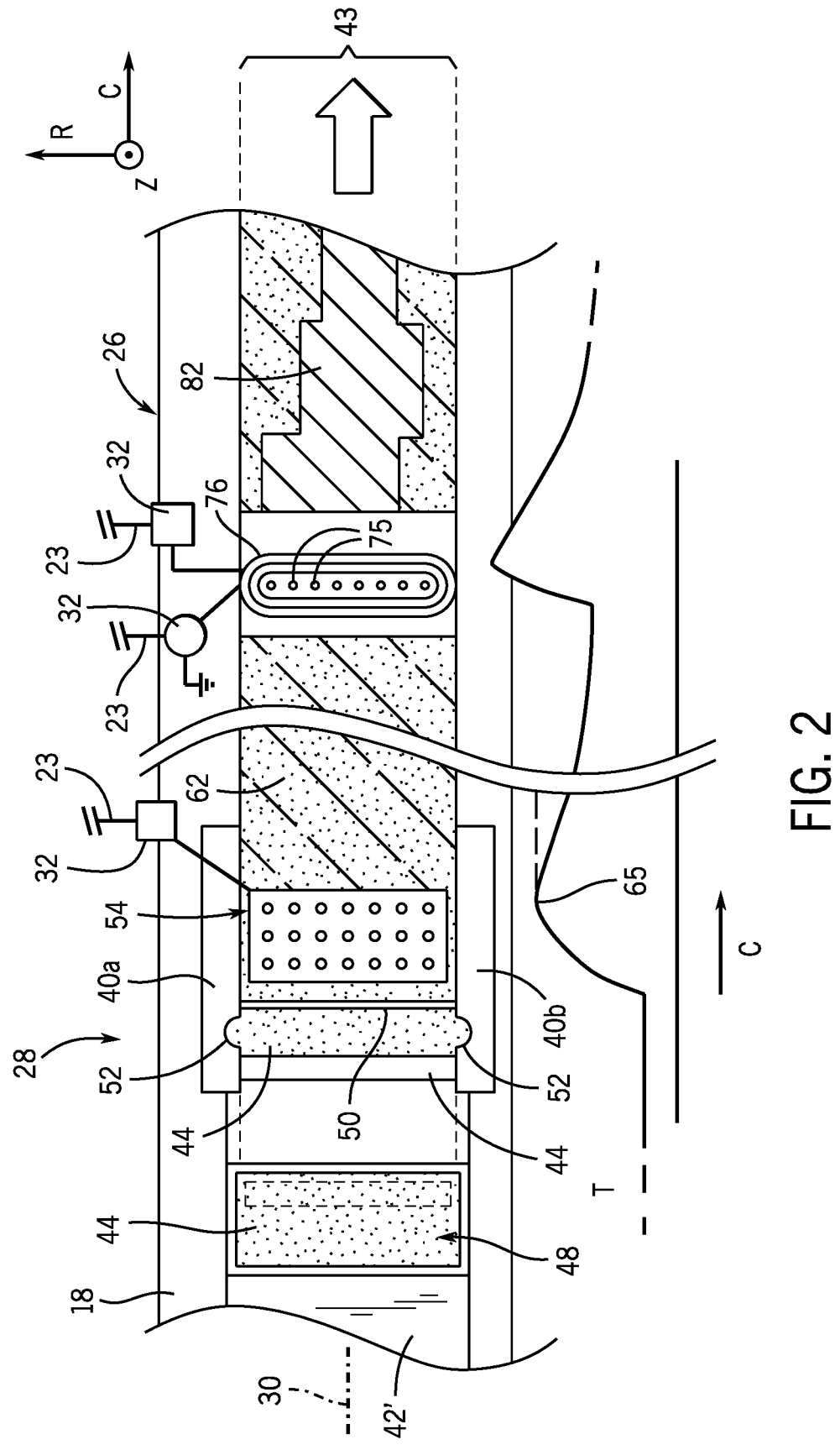
FIG. 2 is a top plan fragmentary view of the continuous printing path (rendered as a straight line for clarity) showing the sequential powder preprocessing station and high-energy fusing station positioned at different locations along the path.
Figure 3:
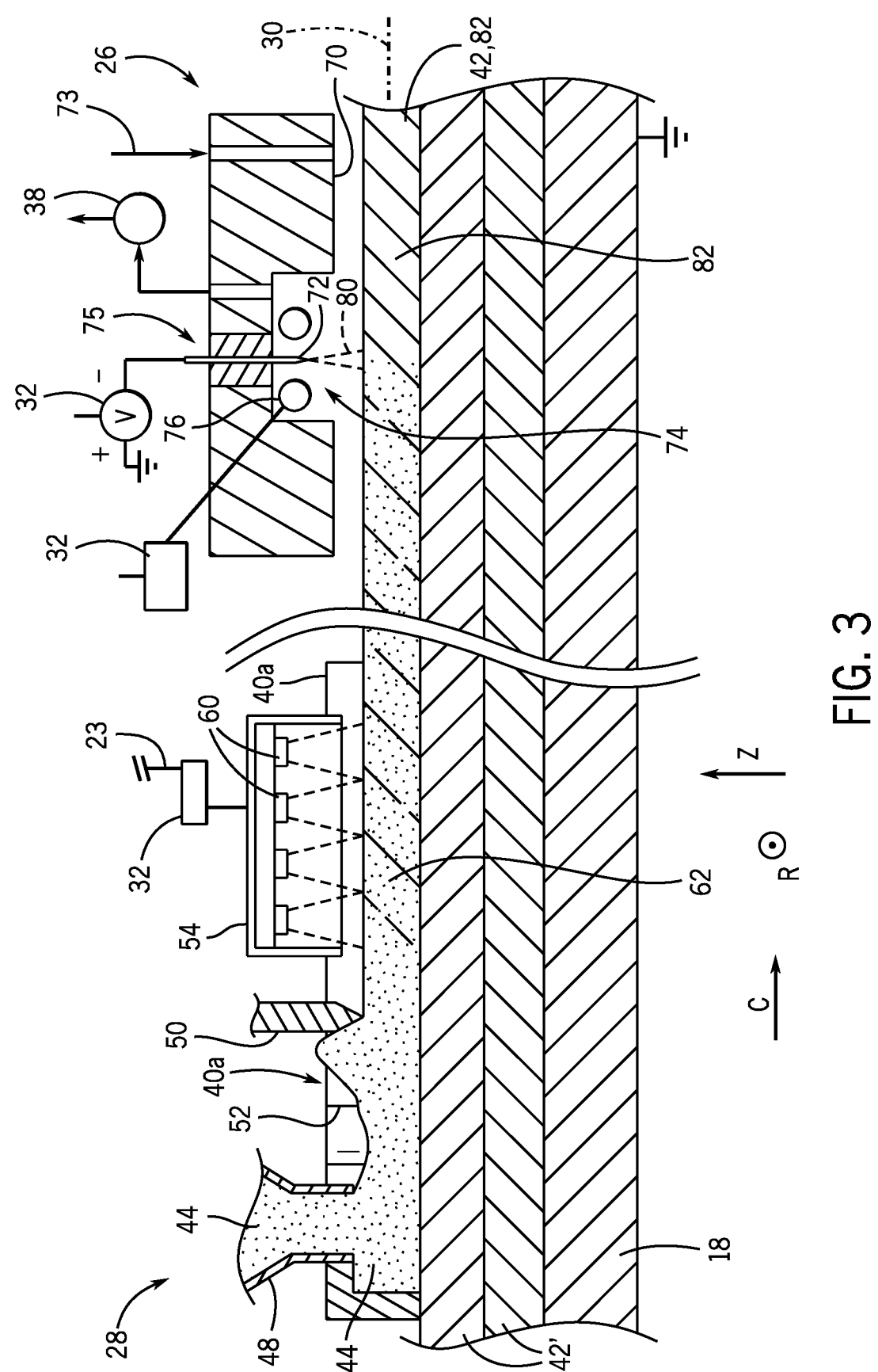
FIG. 3 is a side elevational view of the powder preprocessing and fusing stations of FIG. 2.

Referring now to FIGS. 2 and 3, the powder preprocessing station 28 will generally provide a traveling form comprised of an inner and outer upwardly directed wall 40a and 40b extending a short way along either side of the path 30 and establishing therebetween a print ribbon 43 defining an upper layer 42 of loose powder 44. Generally, the radial width of the print ribbon 43 may be large, having a dimension of more than 10 cm and/or more than 30 cm.

The loose powder 44 will be deposited between the walls 40 from an outlet slot 52 of a powder hopper 48 and may be a pure metal powder without binder material that would otherwise lower strength or density of the finished product. This layer 42 of loose powder 44, for most of the printing process other than the first layer, will be deposited on a previous layer 42' of fused and sintered powder. This previous layer 42' is created from a previous pass of the powder preprocessing station 28 and fusing station 26 around the path 30.

As the print bed 18 rotates (to the right as depicted), the loose powder 44 is drawn against a leveling blade 50 which may be fixed with respect to the walls 40 and excess powder 44 conducted through side outlet slots 52 in the walls 40 to be recycled. The resulting layer 42 passing under the leveling blade 50 may be approximately 50 microns thick and will generally be greater than 20 microns and less than 500 microns thick and, in a limiting case, may be a monolayer equal in height to a powder diameter.

After leveling, the loose powder of the layer 42 may pass under a sintering energy source 54 that sinters the loose powder 44 into a self-supporting sintered matrix 62 over the entire height of the layer 42 and substantially the full width of the ribbon 43 consistent with reducing unnecessary use of powder 44. As is understood in the art, sintering does not fully melt the powder 44 but simply temporarily binds the powder grains together at their surface to provide a self-supporting sintered matrix 62 that is self-supporting but under mechanical pressure may nevertheless be broken apart at a later stage for recycling of the powder 44. The sintering energy source 54 may apply a broadly focused scanned beam of light or electrons (having a focal spot of at least 1 mm), but preferably the sintering energy source 54 provides a broad area energy transfer, for example, simultaneously heating a full width of the ribbon 43 using a fixed array of LEDs, laser diode arrays, or lasers 60 together capable of simultaneously eliminating areas greater than 1 square cm and typically greater than 30 square cm. Broad area simultaneous heating allows rapid sintering and preheating of the layer 42 consistent with the expected printing speed at the fusing station 26.

The invention contemplates that a wide variety of different heating mechanisms may be used for the sintering energy source 54 including but not limited to radiative infrared heaters and electrical induction heaters. Preferably, the sintering energy source 54 is electrostatically neutral so that the powder 44 is not electrostatically charged prior to sintering such as would promote its scattering or dispersal.

It will be appreciated that the treatment area of the sintering energy source 54 may extend freely along the path 30 (limited only by the full distance between the powder preprocessing station 28 and fusing station 26) to allow the process of sintering to be easily adjusted to the speed of fusion and to permit the time for heat to spread through the entire layer 42 for uniform sintering.

The resulting sintered matrix 62, as noted, is desirably sintered over its entire depth so as to be self-supporting as it moves beyond the walls 40 with rotation of the print bed 18. It should be noted that once the layer 42 moves away from the walls 40 with rotation of the print beds 18, and as it moves to be received under the fusing station 26, it is substantially unconstrained in the radial direction.

Referring to FIG. 2, desirably the sintering process may also preheat the powder 44 to improve the speed of fusing of the powder 44 by the fusing station 26 and to reduce temperature differences that would result in unnecessary thermal stress. In this regard, the location of the sintering energy source 54 and speed of rotation of the print bed 18 may be managed so that the peak temperature 65 of the layer 42 upon exiting the sintering energy source 54 does not decay more than 25% prior to fusing.

The fusing station 26 may provide for a bottom surface 70 that closely overlies the upper surface of the layer 42 as it is received under the fusing station 26, a small gap whose size and length provide a high air resistance channel sufficient so that vacuum pump 38, communicating with a cavity 74 extending upwardly from that surface 70, may maintain a harder vacuum in that cavity 74 ($<10^{-4}$ Torr) than the remainder of the vacuum housing 12 ($>10^{-4}$ Torr).

Exposed downwardly within the cavity 74 is a set of electrodes 72 linearly arrayed in a cathode comb 75 extending radially across the print ribbon 43. Surrounding the array of electrodes 72 is a magnetic steering coil 76 that may be used to direct electron-beam 80 over the layer 42 for fusing a portion of that layer into a printed part 82. The fusing process liquefies the powder 44 within the outlines of the printed part 82 in an amount sufficient to create a uniform and essentially void-free solid material surrounded by unprinted sintered matrix 62.

A cathode comb 75 suitable for use in the present invention is described in U.S. Pat. No. 9,981,312 referred to above.

The vacuum pump 38 and the close spacing of the bottom surface 70 of the fusing station 26 to the upper surface of the layer 42 allows the introduction of a jet of cooling gas 73 out from the lower surface 70 to impinge upon the layer 42 to promote the formation of metallic glasses in the molten material created by the electrode 72 without unduly affecting the high vacuum required for the electron-beam 80.

It will be appreciated that with continued rotation of the print bed 18, the upper layer 42 becomes one of the lower layers 42' and that this process may be repeated as the print bed 18 is drawn downward to provide a helical path of printed layer 42 of arbitrary height. The fusing process generally joins the material of layer 42 to similarly fused material of an underlying layer 42'. As noted above, during the fusing process, the self-supporting sintered matrix 62 is substantially unconstrained on the radial direction so as to better accommodate high thermal expansion at the instant of fusing and shortly thereafter without distortion that might be caused by compression between constraining walls.

Figure 4:
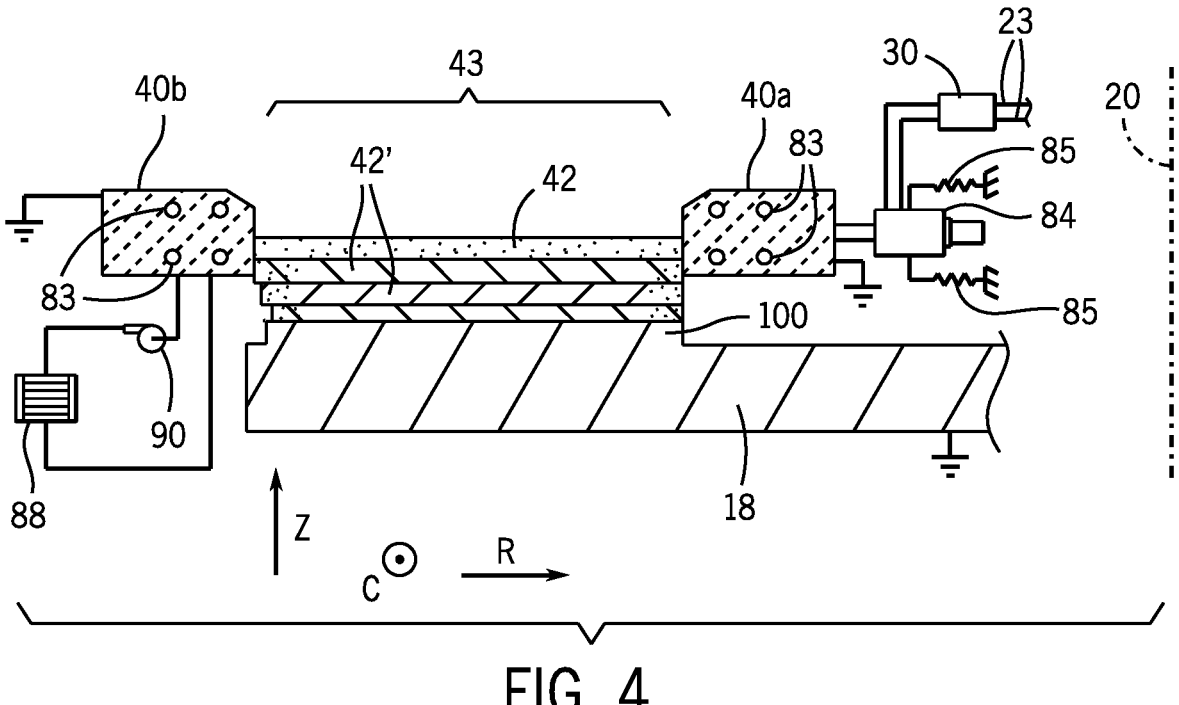
FIG. 4 is an elevational cross-section perpendicular to the helical printing path showing a traveling form for preparing a powder material for sintering.

Referring now to FIG. 4, as noted, desirably the sintering process of layer 42 will occur over the full radial width of the print ribbon 43 and the full height of the layer 42 and will be sufficient to create sintered connections between layer 42 and layer 42'. In order that the walls 40 may withstand the close proximity to such high temperatures, the walls 40 are desirably constructed of a high temperature material such as a ceramic or high temperature metal alloy, and may include cooling channels 83 for circulating coolant through the walls 40 and a heat exchanger 88 using a pump 90 to remove excess heat. The opposed surfaces of the walls 40a and 40b may be arranged to reduce adhesion and thus a tearing of powder 44 from the layer 42, for example, by surface treatments or mechanical means such as a movable belt surfaces minimizing contact time and temperature and hence the propensity of the powder 44 to fuse with the walls 40. In some cases, the walls 40 may be grounded to assist in the neutralization of any charge.

In some embodiments, one or both of the walls 40a and 40b may be mounted on an actuator 84 allowing the separation distance of the walls 40a and 40b to be adjusted, for example, to accommodate printed parts 82 of different widths possible with different widths of print ribbon 43. Such actuators 84 also allow the separation between the walls 40a and 40b to be adjusted dynamically with rotation of the print bed 18, for example, to narrow or widen the print ribbon 43 as a function of rotation. Generally, the walls 40a and 40b may also be spring mounted via springs 85 to provide some ability for the walls 40 to accommodate uneven surfaces of the print layers 42 by moving vertically, radially, or circumferentially. Actuators 84 or springs 85 may also provide slip sticking motion to the walls 40a and 40b where they travel with the layer 42 to permit completion of the sintering then snap back periodically to break any adhesion.

Figure 5:
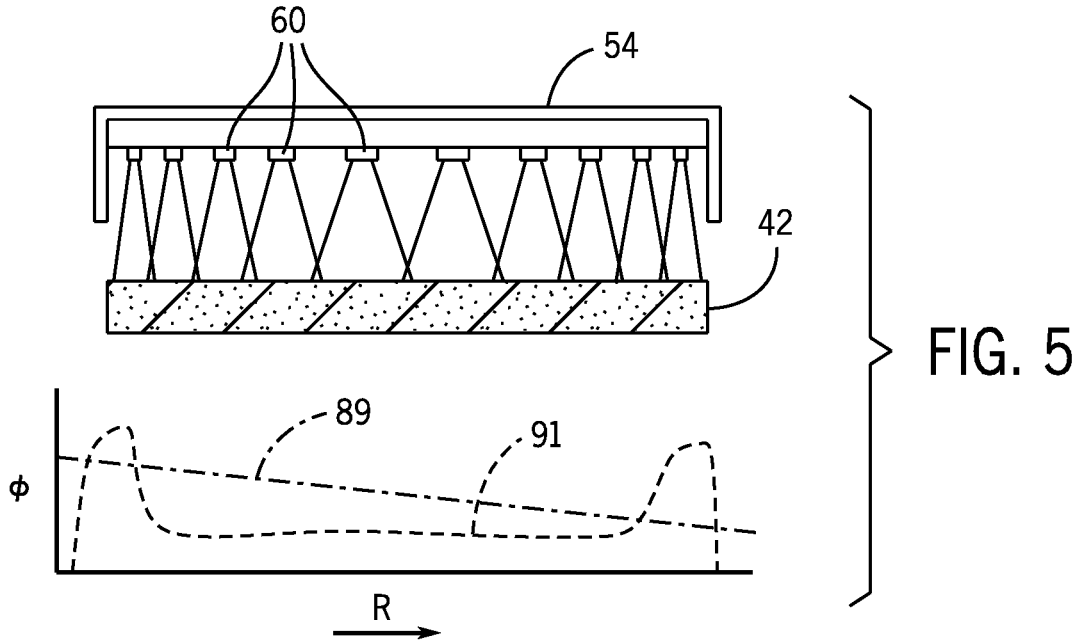
FIG. 5 is a cross-section similar to FIG. 4 positioned at the sintering station and showing a radially varying sintering energy flux.

Referring now to FIG. 5, the sintering energy source 54 may provide for varying heat flux 89 in the radial direction to accommodate the slight keystoning of the area of the layer 42 resulting from the circular helical path 30. In addition, the flux per area 91 provided by the sintering energy source 54 may be adjusted to increase the amount of sintering at the radial edges of the layer 42 to provide improved resistance to powder loss during the printing process and better support of the powder around the printed object.

Generally, the height of the walls 40 is such as to extend only slightly below the current layer 42, for example, halfway into the next succeeding layer 42' to reduce resistance and heat conduction, the sintering serving to provide necessary cohesion in the powder in the lower layers 42'.

Figure 6:
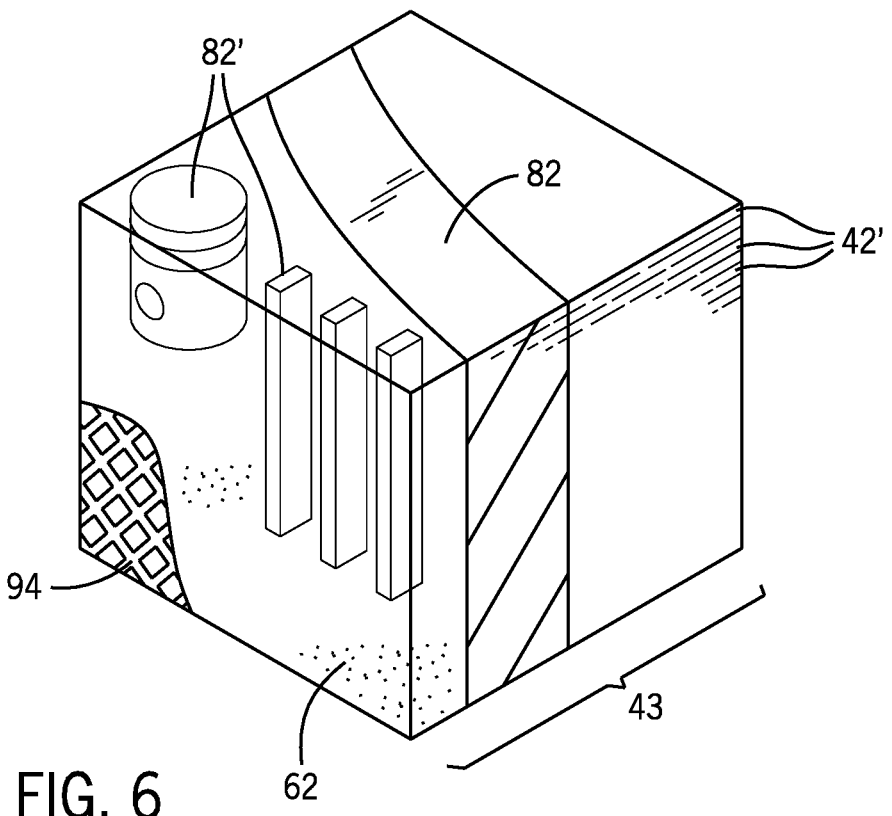
FIG. 6 is a perspective view in phantom of a print volume showing a nesting of multiple parts of different values in the print volume as is practical because the parallel processes of the present invention greatly reduces the time penalty for additional printing in a given volume.
Figure 7:
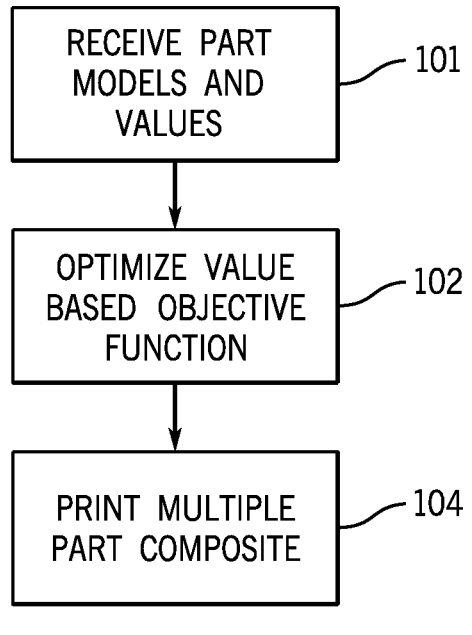
FIG. 7 is a flowchart of the optimization process.

Referring now to FIGS. 6 and 7, the parallel nature of the printing process provided by the above embodiment exacts little or no time penalty for increased printing area (unlike a scanning system) and, accordingly, the present invention may opportunistically operate to surround the printed part 82 with other parts 82' having different economic values or urgency to lower the overall cost of printing per part. This process may be implemented by the computer 34 (shown in FIG. 1) as indicated by process block 101 by receiving a set of different printed part models each assigned to a different value. The value may be the economic value of selling the part with a given delivery schedule. At process block 102, different arrangements of the parts 82 and 82' may be iteratively evaluated using an objective function summing together the total value of the composite print holding the part 82 and one or more parts 82'. In between each iteration, different combinations and orientations of parts 82 and 82' may be implemented with a virtual tumbling of the parts 82 and 82' (rotated in 3 directions and translated in 3 directions). Local maxima in the objective function are avoided using stochastic methods such as simulated annealing or the genetic algorithm.

At process block 104, a printing of the collection of parts 82 and 82' may be implemented containing a larger proportion of solid metal so as to also provide better conduction and reduced need for the ancillary support structure described below.

Generally, it will be understood that additional support for the self-supporting sintered matrix 62 around the part 82 may be provided by printing a frangible scaffold 94 in the radial outermost edges of the layers 42. Generally, the self-supporting sintered matrix 62 has a strength to be self-supporting but to be readily mechanically removed from the part 82 without damage, for example, by high pressure water streams, airstreams, bead blasting, mechanical abrasion, or the like.

Referring again to FIG. 4, the upper surface of the print bed 18 may include a raised rim 100 providing a supporting surface over the width of the ribbon 43 and allowing a surface grinding operation to be performed after removal of the layers 42 for a fresh printing. Prior to printing, a sintered layer 42 may be applied to this raised portion 100 so that printing startup may be accelerated.

Although the highest printing speeds may be achieved with a charged electron beam fusing source, the fusing source may be from other energy sources as is understood in the art, including a high power laser beam, charged particle beam, laser diode array, inductive heater array, infrared heater array, charged particle beam or multiple thereof.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A three-dimension printer comprising:
a print bed for supporting an object to be printed;
a powder dispenser movable along a path for applying layers of powder over the print bed;
a first energy source movable along the path behind the powder dispenser to produce a sintered powder layer;
a traveling form providing two walls opposed across an axis receiving therebetween powder from the powder dispenser and retaining the powder therebetween during sintering; and
a second energy source positionable to selectively liquefy selected portions of the sintered powder to produce a printed part;
wherein the traveling form is adapted to move along the path away from the sintered powder layer after sintering so that the sintered powder layer is substantially unconstrained at its limits on either side of the path during the liquefying process.

2. The three-dimensional printer of claim 1 wherein the first energy source, second energy source, powder dispenser, and traveling form are movable throughout the path projecting to a closed loop on the print bed and may operate in parallel to apply a layer of powder, sinter the powder, and liquefy the sintered powder at different locations along the closed loop.

3. The three-dimensional printer of claim 1 wherein the second energy source is positioned to follow the first energy source at a proximity and speed to prevent an average temperature of the sintered layer from decreasing more than 25% between the sintering and the liquefying.

4. The three-dimensional printer of claim 1 wherein in the print bed rotates about an axis and translates along the axis with respect to the first energy source and second energy source and powder dispenser so that the first energy source and second energy source and powder dispenser pass helically to trace a circular region of the print bed as powder layers are added along a helical path.

5. The three-dimensional printer of claim 1 wherein the two walls of the traveling form are supported to vary separation of the walls as the walls move with respect to the sintered powder layer.

6. The three-dimensional printer of claim 1 wherein the first and second walls include cooling channels for receiving a flowing coolant and further including a heat exchanger and coolant circulation pump communicating with the cooling channels.

7. The three-dimensional printer of claim 1 wherein the first energy source provides a flux per area that varies radially across the print layer to increase sintering near the walls.

8. The three-dimensional printer of claim 1 wherein the sintering energy source provides an area of simultaneous heating of greater than one square centimeter.

9. The three-dimensional printer of claim 1 further including:
an upper housing holding at least one of the powder dispenser, sintering energy source, and second energy source;
a lower housing releasably interfacing with the upper housing during printing and holding the print bed; and
a vacuum separator maintaining a vacuum in the lower housing during separation of the upper and lower housings.

* * * * *